United States Patent Office 3,446,911
Patented May 27, 1969

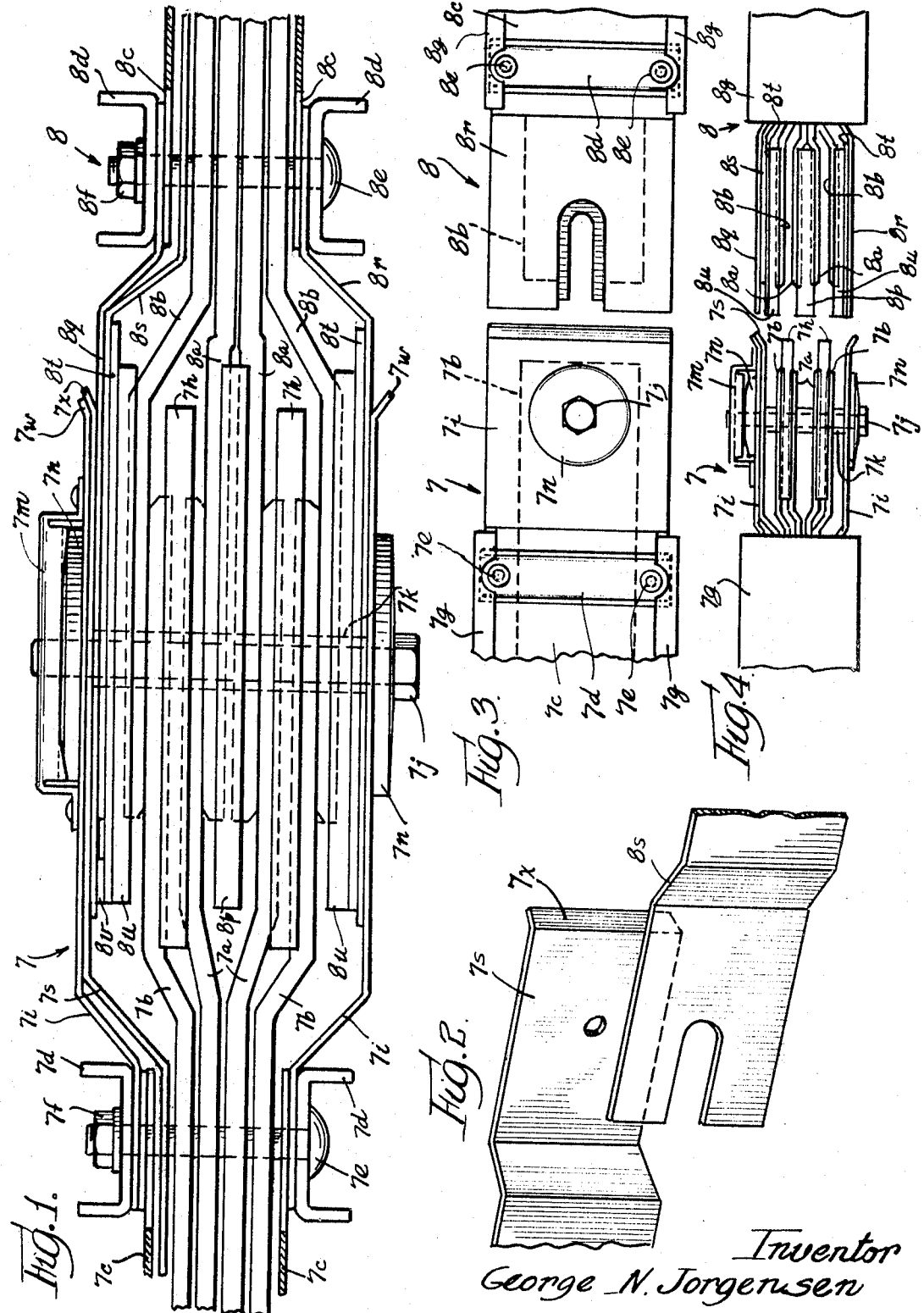

3,446,911
BUS DUCT SECTION WITH GROUND BUS BAR
George N. Jorgensen, Lexington, Ky., assignor to Square D Company, Park Ridge, Ill., a corporation of Michigan
Filed Apr. 11, 1967, Ser. No. 630,110
Int. Cl. H02g 5/04, 15/08; H01b 7/00
U.S. Cl. 174—88                                    5 Claims

ABSTRACT OF THE DISCLOSURE

A section of feeder bus duct having a plurality of bus bars, including a separate bus bar for grounding purposes, and an inside joint cover electrically connected to the grounding bus bar adjacent one end thereof and disposed between the grounding bus bar and that of a second bus duct section when the two bus duct sections are serially connected.

Field of the invention

This invention relates to feeder bus duct generally of the type disclosed in U.S. Patent No. 3,187,086 issued to E. W. Moodie et al. on June 1, 1965.

Summary of the invention

This invention relates to a section of feeder bus duct adapted to be serially connected to another bus duct section of like construction, each bus duct section including a pair of spaced parallel elongated housing members, a plurality of generally flat elongated bus bars, and an additional generally flat elongated ground bus bar. The bus bars are arranged in flatwise parallel and aligned relationship to each other and to the housing members, and are disposed between the housing members, the ground bus bar being disposed between one of the housing members and an adjacent one of the plurality of bus bars. Each of the bus bars, including the ground bus bar, has opposite end portions extending beyond opposite ends of the housing members. A pair of outer joint covers are secured respectively to the housing members adjacent one end, and a pair of inner joint covers are secured respectively to the housing members adjacent the other end. When two duct sections are serially connected, the inner joint covers of one duct section fit between the ground bus bar of the other duct section and the opposite outer joint cover, and one of the inner joint covers of the one duct section electrically connects the ground bus bars of both duct sections.

The addition of a separate bus bar for grounding purposes to each section of feeder bus duct in a run of feeder bus duct, and the connection of the grounding bus bars to ground at the transformer or switchboard in an electrical power supply system, provides a low impedance path to ground in case of a short circuit between a bus bar of one of the bus duct sections and its grounded housing, or in case of a short circuit between an electrical conductor in the equipment which the run of feeder bus duct feeds and the grounded housing of the equipment. With a low impedance ground path, the duct housing and the equipment housing will remain at or very near ground potential even though a short circuit occurs. Also, by providing a ground path impedance lower than that which would be realized by using only the housings of the bus duct sections, a larger ground current can be drawn, thus opening an overcurrent protective device more quickly and reducing the possibility of damage to equipment and injury to personnel.

Brief description of the drawing

FIG. 1 is a top plan view of a joint between two like sections of bus duct constructed in accordance with the invention, each bus duct section having four full-size bus bars for use in a three-phase, four-wire system and a smaller bus bar for grounding purposes, and the joint tie channels, bus bar insulation, and portions of the housings of the bus duct sections being omitted;

FIG. 2 is a fragmentary perspective view of the right-hand end portion of the grounding bus bar of the left-hand bus duct section of FIG. 1 and the left-hand end portion of the grounding bus bar of the right-hand bus duct section of FIG. 1;

FIG. 3 is a fragmentary side elevational view of the right-hand end portion of the left-hand bus duct section of FIG. 1 and the left-hand end portion of the right-hand bus duct section of FIG. 1 before the bus duct sections are joined as in FIG. 1; and FIG. 4 is a fragmentary top plan view of the portions of the bus duct sections shown in FIG. 3.

Description of the preferred embodiment

The bus duct section of this invention is an improvement of the bus duct disclosed in U.S. Patent 3,187,086, to which reference may be made for a more detailed description of the general construction of the bus duct section of this invention.

FIGS. 1, 3, and 4 fragmentarily show a pair of like bus duct sections 7 and 8. More specifically a right-hand end portion of the bus duct section 7 and a left-hand end portion of the bus duct section 8 are shown, it being understood that the bus duct section 7 has a left-hand end portion identical to that shown for the bus duct section 8, that the bus duct section 8 has a right-hand end portion identical to that shown for the bus duct section 7, and that bus duct sections such as the bus duct sections 7 and 8 are normally manufactured in lengths of ten feet measured between joint centers.

The bus duct section 7 includes a pair of generally flat, elongated inner bus bars 7a and a pair of generally flat, elongated outer bus bars 7b secured between a pair of spaced, parallel, elongated side housing members 7c in flatwise parallel relationship to each other and to the side housing members 7c, which are clamped adjacent opposite ends respectively by pairs of clamps 7d, only a right-hand pair of which is shown. The bus bars 7a and 7b are insulated from each other and from the side housing members 7c, the insulation not being shown. Clamping pressure for each pair of clamps 7d is furnished by a pair of bolts 7e extending respectively through opposite end portions of the clamps 7d in spaced relationship respectively to opposite edge portions of the bus bars 7a and 7b. The bolts 7e are provided respectively with nuts 7f, only one of which is shown.

As more fully disclosed in the above-mentioned patent, the side housing members 7c are channel-shaped, except for opposite end portions respectively clamped by the pairs of clamps 7d, and are secured to a pair of channel-shaped upper and lower housing members 7g.

A pair of insulators 7h are trapped respectively between the inner bus bars 7a and the outer bus bars 7b adjacent the right-hand end portions thereof.

A pair of outer joint covers 7i are clamped respectively between the side housing members 7c and the right-hand pair of clamps 7d of the bus duct section 7.

A bolt 7j provided with an insulating sleeve 7k extends through aligned holes in the right-hand end portions of the bus bars 7a and 7b and also through aligned holes in the insulators 7h and outer joint covers 7i, and is threaded into a captive nut (not shown) held in a nut retainer 7m secured to one of the outer joint covers 7i. A pair of spring washers 7n are mounted on the bolt 7k respectively on the outer sides of the outer joint covers 7i.

The bus duct section 8 is identical to the bus duct section 7 and includes a pair of inner bus bars 8a, a pair of outer bus bars 8b, and a pair of side housing members 8c clamped adjacent opposite ends respectively by pairs of clamps 8d, only a left-hand pair of which is shown. Clamping pressure for the clamps 8d is furnished by bolts 8e and nuts 8f. The side housing members 8c are secured to a pair of channel-shaped upper and lower housing members 8g.

An insulator 8p is trapped between the inner bus bars 8a adjacent the left-hand end portions thereof.

A pair of inner joint covers 8q and 8r are clamped respectively between the side housing members 8c and the left-hand pair of clamps 8d of the bus duct section 8.

In accordance with the invention, the bus duct section 7 is provided with a bus bar 7s, hereinafter referred to as a ground bus bar, for grounding purposes. The ground bus bar 7s is thinner than the bus bars 7a and 7b and is disposed between one of the outer bus bars 7b and the respective one of the side housing members 7c. The bus duct section 8 is provided with an identical ground bus bar 8s. The right-hand end portion of the ground bus bar 7s underlies a respective one of the outer joint covers 7i, while the left-hand end portion of the ground bus bar 8s underlies the inner joint cover 8q. In bus duct sections not having a ground bus bar such as the ground bus bars 7s and 8s, the outer joint covers 7i and the inner joint covers 8q and 8r are normally made of steel and painted. However, in accordance with this invention, the inner joint cover 8q is made of the same material as the ground bus bars 7s and 8s, for example copper or aluminum, and instead of being painted, the inner joint cover 8q is plated with silver or tin for the purpose of good electrical contact with the ground bus bars 7s and 8s, and becomes a part of the grounding circuit.

A pair of insulators 8t are secured respectively to the inner joint cover 8r and to the inner side of the left-hand end portion of the ground bus bar 8s. Further, another pair of insulators 8u are trapped respectively between the left-hand end portion of the outer bus bars 8b and the insualtors 8t. A spacer 8v is secured between the left-hand end portions of the inner joint cover 8q and a respective one of the insulators 8t.

The outer joint covers 7i are provided respectively with outwardly flared extreme end portions 7w and the right-hand end portion of the ground bus bar 7s is provided with an outwardly flared extreme end portion 7x for ease in connecting the bus duct section 8 to the bus duct section 7.

The ground bus bars 7s and 8s are disposed close to respective ones of the outer bus bars 7b and 8b to reduce the ground path impedance, and they may be wrapped in insulating cloth respectively with the bus bars 7a and 7b and the bus bars 8a and 8b for bracing against electromagnetic forces caused by a short circuit. Further, the connection between the ground bus bars 7s and 8s is made at the same time the bus duct sections 7 and 8 are slipped together and the bolt 7j tightened to connect the bus bars 7a and 7b respectively with the bus bars 8a and 8b.

Terms such as "right-hand" and "left-hand" are used herein only for convenience of description of the drawing and are not to be construed as limiting the invention, it being understood that the bus duct sections illustrated could be reversed end-for-end or installed in various other positions.

I claim:
1. A bus duct section adapted to be serially connected to another bus duct section of like construction, said bus duct section comprising a pair of spaced parallel elongated housing members, a plurality of generally flat elongated bus bars arranged in flatwise parallel and aligned relationship to each other and disposed between said housing members in flatwise parallel and aligned relationship thereto, a generally flat elongated ground bus bar arranged in flatwise parallel and aligned relationship to said plurality of bus bars and said housing members, said ground bus bar being disposed between one of said housing members and an adjacent one of said plurality of bus bars, said ground bus bar and the bus bars of said plurality of bus bars each being longer than said housing members and each having opposite end portions extending beyond opposite ends of said housing members, a pair of outer joint covers secured respectively to said housing members adjacent one end thereof, and a pair of inner joint covers secured respectively to said housing members adjacent the other end thereof, one of said end portions of said ground bus bar being disposed substantially parallel to and in engagement with an inner surface of a respective one of said outer joint covers, the other of said end portions of said ground bus bar being disposed substantially parallel to and in engagement with an inner surface of a respective one of said inner joint covers, and said one of said end portions of said ground bus bar and the other of said outer joint covers being spaced apart sufficiently to receive therebetween the inner joint covers of another like bus duct section, whereby when a second bus duct section is serially connected to said first-mentioned bus duct section in such a manner that an end portion of the second bus duct section having a pair of inner joint covers is connected to an end portion of said first-mentioned bus duct section having said pair of outer joint covers, the inner joint covers of the second bus duct section are disposed between said one of said end portions of said ground bus bar and said other of said outer joint covers of said first-mentioned bus duct section, said one of said end portions of said ground bus bar of said first-mentioned bus duct section is disposed between said respective one of said outer joint covers of said first-mentioned bus duct section and a respective one of the inner joint covers of the second bus duct section, and the respective one of the inner joint covers of the second bus duct section is disposed between and in electrical contact with said one of said end portions of said ground bus bar of said first-mentioned bus duct section and an end portion of the ground bus bar of the second bus duct section.

2. A bus duct section claimed in claim 1, wherein said ground bus bar and said respective one of said inner joint covers are made of the same material.

3. A bus duct section as claimed in claim 1, wherein said ground bus bar and said respective one of said inner joint covers are made of the same base material and similarly plated.

4. A pair of bus duct sections each as claimed in claim 1, a second of said bus duct sections being serially connected to a first of said bus duct sections, an end portion of the second bus duct section having the pair of inner joint covers being connected to an end portion of the first bus duct section having the pair of outer joint covers, and a single bolt extending through and establishing contact pressure respectively between the plurality of bus bars of the first bus duct section and the plurality of bus bars of the second bus duct section and also between the ground bus bar of the first bus duct section and a respective one of the inner joint covers of the second bus duct section.

5. A bus duct section as claimed in claim 1, wherein said outer joint covers and said one end portion of said ground bus bar are provided with outwardly flared extreme end portions.

References Cited

UNITED STATES PATENTS 3,189,680   6/1965   Stanback     174—88
3,376,377   4/1968   Fehr     174—88

DARRELL L. CLAY, Primary Examiner.

U.S. Cl. X.R.

174—68